July 9, 1963  A. G. AHLSTONE ETAL  3,096,999
PIPE JOINT HAVING REMOTE CONTROL COUPLING MEANS
Filed July 7, 1958  2 Sheets-Sheet 1
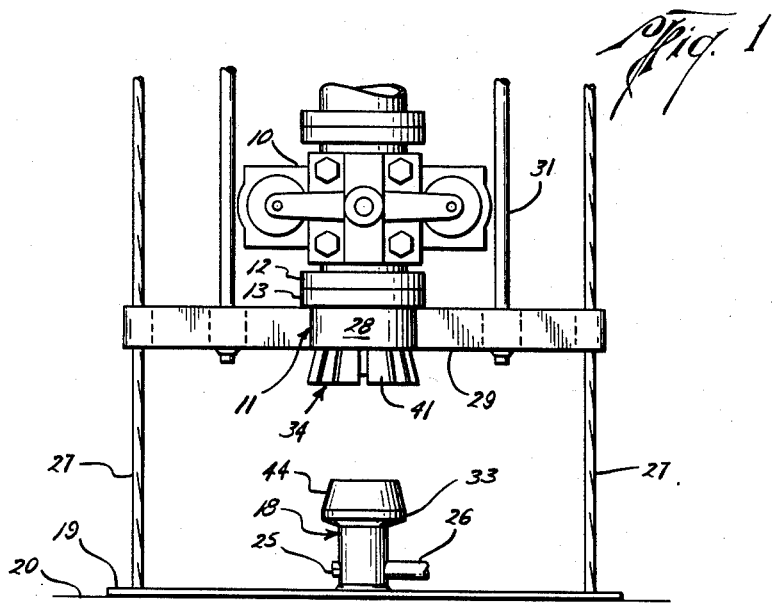
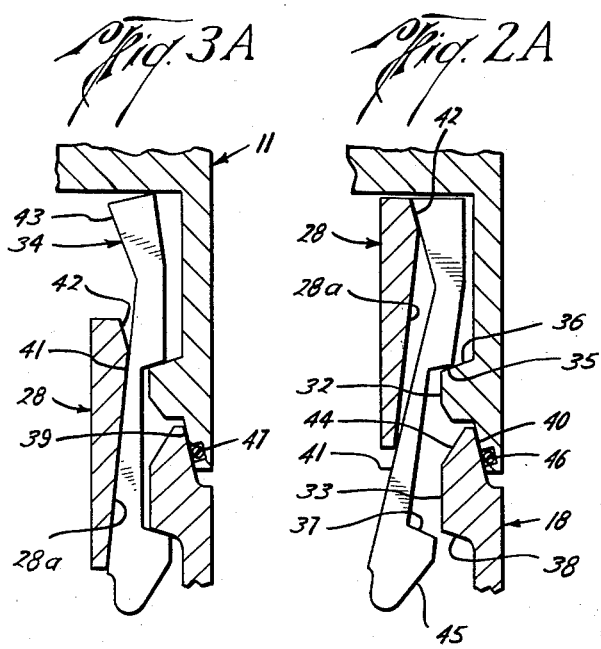
Arthur G. Ahlstone
Marvin R. Jones
INVENTORS
BY
ATTORNEYS July 9, 1963

A. G. AHLSTONE ETAL 3,096,999

PIPE JOINT HAVING REMOTE CONTROL COUPLING MEANS

Filed July 7, 1958

Arthur G. Ahlstone
Marvin R. Jones
INVENTORS

BY Browning, Simms, Hyer
& Eickenroht
ATTORNEYS

United States Patent Office 3,096,999
Patented July 9, 1963

3,096,999
PIPE JOINT HAVING REMOTE CONTROL
COUPLING MEANS
Arthur G. Ahlstone and Marvin R. Jones, Houston, Tex., assignors to Cameron Iron Works, Inc., Houston, Tex.
Filed July 7, 1958, Ser. No. 746,997
3 Claims. (Cl. 285—24)

This invention relates generally to pipe couplings and, more particularly, to pipe couplings in which one conduit is to be connected to another at a remote and inaccessible location.

This invention finds particular utility in the recovery of petroleum from offshore reservoirs located under water too deep to permit the economical construction of piling platforms. In such instances, it is desirable to drill and complete the wells from floating platforms or ships, in which case the pressure control equipment is located far beneath the surface of the water. Thus, the connections between various parts of such equipment, which are raised and lowered during the drilling and completion process, must be made and broken at this depth.

It has heretofore been proposed to raise and lower such equipment by means of guide cables extending between the platform and the bottom of the water. However, conventional means for making and breaking such connections require simultaneous rotary and reciprocatory movements, which are extremely difficult to apply from the platforms or ships at the water level. Such connections are further complicated by the great amount of vibration attendant to drilling operations, which tends to loosen and wear the joint between the conduits.

An object of this invention is to provide a pipe coupling in which such connections can be made and broken automatically in response to only a reciprocatory manipulation.

Another object is to provide a pipe coupling of the type described in the foregoing object which automatically compensates for wear of the joint between the conduits due to such vibrations.

A further object is to provide a pipe coupling of this type in which a seal member in the joint between the conduits is protected from the well fluids and prevented from extrusion therebetween.

Other objects, advantages and features of this invention will be apparent to one skilled in the art upon a consideration of the written specification, the attached claims and the annexed drawings.

These and other objects are accomplished, in accordance with the present invention, by a pipe coupling which comprises a first conduit supportable in a substantially upright position, a second conduit having a surface at one end for mating engagement with the upwardly facing end surface of the first conduit, and means including a member for supporting the second conduit with its end surface facing downwardly to guidably lower it into mating engagement with the end surface of the first conduit. The first conduit is provided with a downwardly facing shoulder, and dogs having lands thereon are carried by the second conduit for movement, when the end surfaces of the conduits are so engaged, between positions in which the lands are engaged beneath the shoulder to lock the second conduit to the first conduit and in which such lands are retracted from beneath the shoulder to release the second conduit from the first conduit.

This supporting member is movable downwardly from and upwardly to second conduit supporting position, and means are provided on said supporting member and the dogs for cooperation, in response to such downward movement of the supporting member, to move the dogs into locked position and, in response to such upward movement thereof, to retract the dogs from locking position. In this manner, the second conduit may be lifted from the first conduit upon continued upward movement of the supporting member so that, as noted above, the connection may be broken as well as made automatically upon mere reciprocatory manipulation.

In accordance with another novel aspect of the present invention, the shoulder and the lands on the dogs are tapered at an angle less than the friction angle thereof. Thus, there is little or no tendency to displace the dogs outwardly when the joint between the conduits is placed in tension.

According to a still further novel concept of the invention, the end surfaces of the conduits are provided with interfitting parts and an annular seal member of flowable material is carried by the interfitting part of one conduit for sealing engagement with the interfitting part of the other conduit. The innermost of said parts is outwardly expandable under pressure at least as fast as the outermost part, such that a mechanical closure is maintained behind the seal member and well fluid is prevented from admittance thereto. This relationship of the expansion of the two conduits may be controlled by the thickness thereof. It is preferred that the interfitting part of the second conduit be the innermost, and that the parts be conically shaped such that they aid in guiding the end surface of the second conduit into mating engagement with that of the first. Still further, it is preferred that the seal member be carried by the second conduit so that it may be replaced, if desired.

The means for guidably lowering the end surfaces of the second conduit into making engagement with such surfaces of the first conduit also includes vertically extending guide cables anchored at their lower ends to the base upon which the first conduit is supported and arms supported by the supporting member and extending radially therefrom for guidably sliding over the guide cables. Vertically reciprocable rods are guided by the arms and suspend the supporting member for vertical movement between the positions described.

In a preferred form of the invention, the second conduit is provided with an upwardly facing shoulder, and the dogs have another land spaced above the first-mentioned land. More particularly, the dogs are carried by the second conduit for swinging between positions in which the lands are engaged above and beneath the shoulder on the second and first conduits, respectively, to lock the second conduit to the first conduit, and in which the lower land is retracted from beneath the shoulder on the first conduit to release the second conduit from the first conduit. A surface on the supporting member is slidable over surfaces on the dogs, during downward movement of the supporting member from its supporting position, to move the dogs into locking position. This surface is movable out of engagement with said surfaces on the dogs, during upward movement of the supporting member toward its supporting position, to permit retraction of the dogs from locking position. There is also another surface on the supporting member which engages the toes on the dogs, upon said movement of the first-mentioned surface out of engagement with the surfaces on the dogs, to retract the dogs from locking position.

In this preferred form of the invention, both shoulders as well as the upper and lower lands on the dogs are tapered at an angle less than the friction angle thereof for the purpose previously described. Also, the slidable surfaces on the supporting member and the dogs are tapered at an angle less than the friction angle thereof, so that any tendency for outward forces to cause the supporting member to move toward releasing position will be overcome.

In the drawings, wherein like reference characters are used throughout to designate like parts:

FIG. 1 is an elevational view of the preferred form of the coupling of the present invention, wherein the second conduit and a blowout preventer connected thereabove are being lowered into connection with the first conduit, which is a tubing head or other wellhead member supported at the bottom of a deep body of water;

FIG. 2A is an enlarged detail view of one of the dogs in the position of FIG. 2;

FIG. 3A is an enlarged detail view of one of the dogs in the position of FIG. 3.

Figures 2, 3:
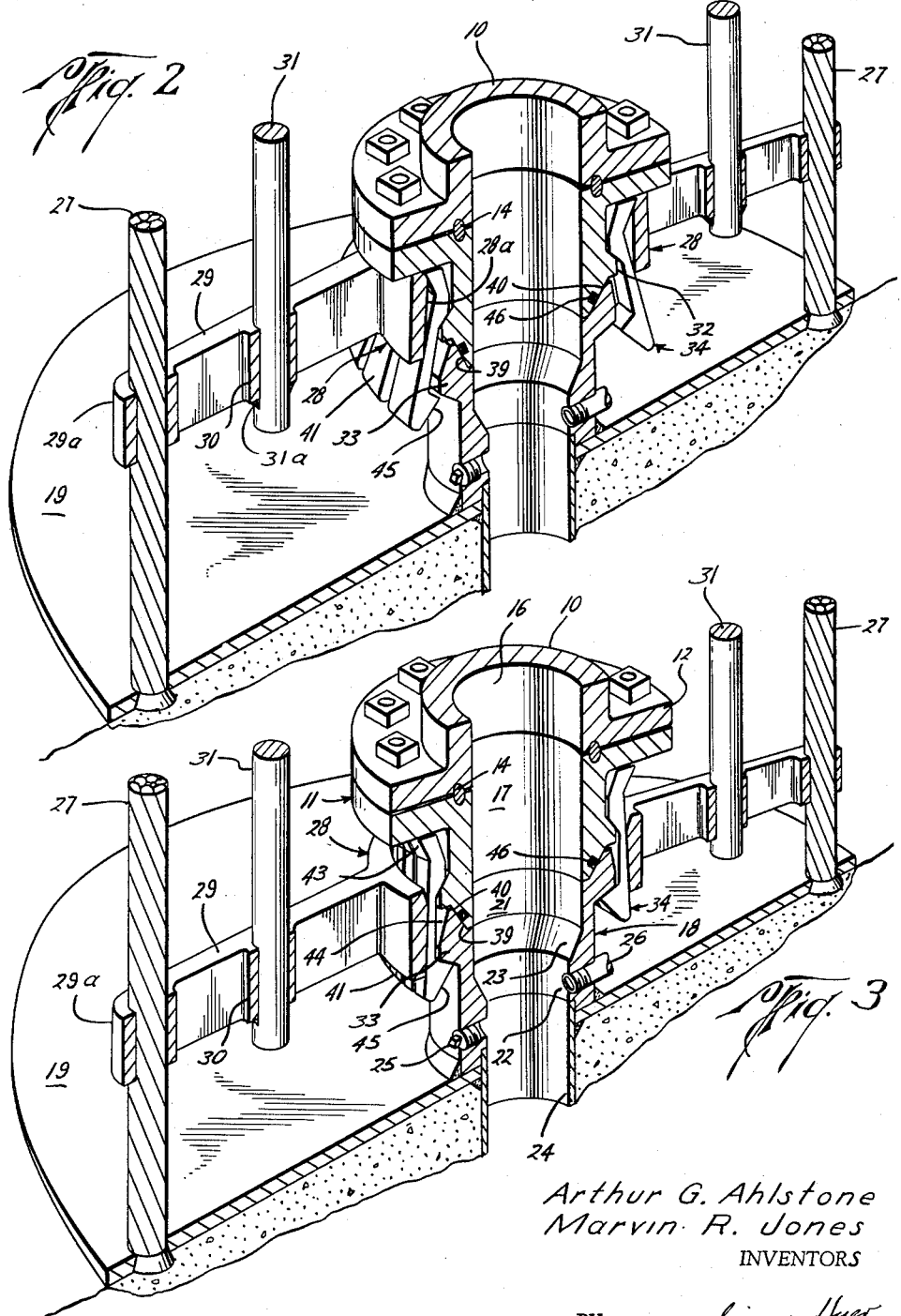
FIG. 2 is an enlarged perspective view, in vertical cross section, of the embodiment of FIG. 1, wherein the end surface of the second conduit has been lowered into mating engagement with that of the first conduit.
FIG. 3 is a view similar to FIG. 2, but in which the supporting member has been lowered from its second conduit supporting position to move the dogs into locking position.

Turning now to the above-described drawings, the blowout preventer 10, which may be of any conventional construction such as shown in Patent No. 2,387,106, is connected above the second conduit 11 by flanges 12 and 13 on the preventer and conduit, respectively. As shown in FIGS. 2 and 3, the abutting end surfaces of these flanges are grooved to receive an annular seal ring 14 therebetween, and bolts 15 are received through aligned holes in the flanges for drawing them toward one another to form the seal. When the preventer and second conduit are so connected, the central openings 16 and 17 therethrough are axially aligned to form a flow passage.

The first conduit 18, which is a tubing head or other wellhead member, is supported in a substantially upright position upon a wide base 19 fixedly disposed at the bottom 20 of a body of water. The upper portion 21 of the bore of the tubing head is of a diameter corresponding to that of the bore 17 through the second conduit for connection in axially aligned relation therewith, as shown in FIGS. 2 and 3. Intermediate the upper portion 21 and a lower reduced diameter portion 22 of the bore of the tubing head is a tapered seat 23 upon which a tubing hanger (not shown) may be landed in completing the well. A casing 24 is connected at its upper end to the lower end of the tubing head in alignment with the bore therethrough and extends downwardly therefrom to a desired depth. The tubing head is also provided with one or more lateral ports beneath the seat 23, one of which is closed by a plug 25 and the other of which threadedly connects with a pipe 26 for communicating the pipe with the annulus between the tubing suspended by the tubing head and the casing 24.

Inasmuch as the utility of such equipment is well known to those skilled in the wellhead art, and further since the coupling of this invention is also useful in connection with other aspects of the well drilling and completion process, a detailed description thereof is unnecessary. It is sufficient to note in illustrating the invention that during such process, it is necessary to connect the blowout preventer 10 with the tubing head 18 and then remove it therefrom so that other equipment may be connected therewith. It should also be noted that while the blowout preventer is connected with the tubing head, and the well is being drilled, considerable vibration is imparted to the conduits.

The second conduit 11 is supported and lowered into connection with the first conduit by means of a supporting member 28 which comprises an annular ring having an upper end of lesser diameter than the flange 13 of the second conduit for abutment with lower surfaces thereof. Arms 29 on the supporting member 28 extend radially outwardly therefrom and have sleeves 29a slidably surrounding guide cables 27 for guided reciprocation during raising and lowering of the second conduit. As shown, the cables are anchored at 27a to the base 19 for extension upwardly therefrom to the platform or ship at water level. More particularly, the arms 29 are provided with sleeves 30 at intermediate locations for receiving the lower end of relatively rigid rods 31 which, as shown in FIGS. 2 and 3, are fixedly secured to the arms 29 by welding 31a or other means.

The lower end of the second conduit 11 is flanged at 32 and the upper end of the first conduit 18 is flanged at 33. Also, the inner surface 28a of the ring 28 is spaced from the outer diameter of the second conduit beneath its upper flange 13 to provide an annular space to receive the upper end of dogs 34. More particularly, and as best shown in FIGS. 2A and 3A, the upper ends of the dogs 34 are provided with inwardly extending and downwardly facing upper lands 35 for seating upon an upwardly facing shoulder 36 on the flange 32 of the second conduit. The lower ends of the dogs are provided with inwardly extending and upwardly facing lower lands 37 which are seatable, in the locked position of the dogs, upon a downwardly facing shoulder 38 on the flange 33 on the upper end of the first conduit. As will be apparent from FIGS. 2A and 3A, the space between the inner surface 28a of the ring 28 and the flange 32 is reduced to prevent the upper end of the dogs from falling therethrough during reciprocation of the ring and thereby carry the dogs from the second conduit. On the other hand, the recessed portion of the dogs intermediate the two lands 35 and 37 enables the dogs to swing between the position of FIG. 2A for releasing the second conduit from the first conduit and the position of FIG. 3A for locking the second conduit to the first conduit.

The lands 35 and 37 are so spaced apart that when the end surface 39 of the second conduit has been lowered into mating engagement with the upwardly facing end surface 40 on the first conduit, the lower land 37 will be in the position shown in FIG. 2A for moving inwardly into engagement beneath the shoulder 38. This movement of the dogs into locking position is caused by releasing the tension in the rods 31 and lowering them out of engagement with flange 13 to permit the inner surface 28a of the ring 28 to slide downwardly along the outer surface 41 of the dogs. Due to the weight of the ring and its arms, as well as a downward and outward taper on the ring surface and dogs, said inner surface 28a of the ring will force the lower land 37 beneath the shoulder 38. On the other hand, when it is desired to release the second conduit from the first conduit, the rods are raised to move ring 28 upwardly out of sliding engagement with the surface 41 on the dogs. During such upward movement, and prior to engagement of the upper end of the ring 28 with flange 13, a surface 42 on the ring abuts with a toe 43 on the upper end of the outer surface 41 of the dogs so as to swing them into a position in which the land 37 is removed from beneath the shoulder 38. Continued raising of the rods and ring moves the upper end of the latter into engagement with the flange 13, so that the second conduit is again supported by the ring and can be lifted from the first conduit.

The upper side of the flange 33 of the first conduit is tapered downwardly and outwardly at 44, and the lower end of the dogs is tapered correspondingly at 45 so as to facilitate lowering of the dogs past the flange 33 and into the position of FIG. 2A.

The upper ends of the dogs may be inserted into and removed from the annular space in which they are received by movement of the ring 28 downwardly from the position of FIG. 3A. This may be done, of course, at water level or another convenient location where the second conduit is removed from the first conduit.

Referring more particularly to FIG. 3A, each of the lands 35 and 37, as well as the shoulders 36 and 38 with which they engage, are preferably tapered at an angle with respect to the horizontal less than the friction angle thereof so as to resist the tendency for fluid pressure within the conduits to separate them. This friction angle is, of course, the angle whose tangent is the coefficient of static friction between the surfaces. It is also preferred that the inner surface 28a of the ring 28, as well as the outer surface 41 on the dogs, be tapered at an angle less than the friction angle thereof, which angle, in this case, is formed with respect to the vertical. Thus, vibration of the two conduits will not be effective to move the ring in a loosening or releasing direction, but rather will permit it to tighten further the connection between the two conduits. Obviously, such vibration of the conduit will result in pulsating pressure of surface 41 against surface 28a. An increase of such pressure will not cause the ring 28 to move relative to the dog 34 due to the above-specified disposition of the taper of surfaces 41 and 28a. On the other hand, the alternate reduction of such pressure will permit ring 28 to move downwardly under its own weight, thereby tightening the connection.

The mating end surface 39 of the second conduit is tapered downwardly and inwardly, while the mating surface 40 on the first conduit is tapered upwardly and outwardly to receive the surface 39. Thus, these interfitting parts serve to center the second conduit as it is lowered into connection with the first conduit. An annular seal ring 46 of any suitable flowable resilient material is carried within a groove 47 on the mating end surface 39 of the second conduit for sealing engagement with the mating end surface 40 of the first conduit. As previously mentioned, the second conduit will be so related to the first conduit as to expand outwardly at a greater rate than the first conduit, such that the metal-to-metal surfaces between the two mating end surfaces will always be tight enough to provide a backup for the seal ring as well as to prevent the admission of well fluids to such ring. As previously mentioned, this relationship may be obtained by a second conduit of lesser thickness than the first conduit.

The disposition of the seal ring 46 intermediate the mating end surfaces of the two conduits will, of course, provide pressure responsive areas on the inner annular portions of the two conduits which will tend to separate the connection therebetween. However, as previously described, this tendency is effectively resisted by the taper of the lands of the locking dogs.

The blowout preventer 10 or other wellhead equipment is connected to the second conduit 11 at water level, and both are lowered by the rods 31 with the end surface 39 on the second conduit facing downwardly. As they are lowered, these rods are guided by the cables 27 through the arms on the supporting member of each embodiment.

As the second conduit nears the first conduit, the conically shaped end surface 39 will more accurately guide the second conduit into place by interfitting with the upwardly facing end surface 40 of the first conduit. Further lowering of the second conduit will cause end surface 39 to mate with end surface 40 and seal ring 46 to engage with the surface 40 so as to seal the joint between the two conduits.

At the same time, the locking dogs have been moved into a position in which the lands thereon are positioned for movement into engagement beneath the shoulder 38 on the flange of the first conduit. Upon downward movement of the annular ring from supporting position, in response to the release of tension in the rods 31 and further lowering thereof, the dogs are moved inwardly into locking position beneath the aforementioned shoulder of the first conduit.

When it is desired to lift the second conduit from the first conduit, so as to remove the blowout preventer 10 or other wellhead equipment, the annular ring need only be moved upwardly by lifting of the rods 31. This upward movement of the annular ring first retracts the dogs into releasing position by moving them outwardly from beneath the shoulder 38 of the first conduit, and then raises the second conduit from the first conduit by moving said ring into engagement beneath the flange 13. Obviously, the blowout preventer and second conduit are guided as they are raised by the guide cables 27.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A coupling, comprising a first conduit supported in a substantially upright position, a second conduit having a surface at one end for mating engagement with the end surface of the first conduit and having another surface facing downwardly and disposed radially outwardly of said end surface of the second conduit, a vertically reciprocable supporting member engageable in its uppermost position beneath the downwardly facing surface of the second conduit to support said second conduit with its end surface disposed for lowering guidably into mating engagement with the end surface of said first conduit, a downwardly facing shoulder on the first conduit, an upwardly facing shoulder on the second conduit, and dogs having vertically spaced-apart lands on the inner surfaces thereof with the upper lands supported on the shoulder of the second conduit for swinging between positions in which the lower lands are engaged beneath the shoulder on the first conduit to lock the second conduit to the first conduit, when the end surfaces thereof are in mating engagement with one another, and in which the lower lands are retracted from beneath the shoulder on the first conduit to release the second conduit from the first conduit, said supporting member being disposed about the dogs and having an inner camming surface slidable over the outer surfaces on the dogs to swing the dogs into locking position, during downward movement of the supporting member from its uppermost position, and movable out of camming engagement with said surfaces to permit the dogs to swing into releasing position, during upward movement of the supporting member from dog locking position, and said dogs having outwardly projecting parts on the upper ends of their outer surfaces which are engaged by the supporting member during its upward movement so that the supporting member holds the dogs in releasing position, as the second conduit is lowered into the first conduit, and swings the dogs from locking to releasing position as supporting member approaches engagement with the downwardly facing surface on the second conduit in order to lift the second conduit from above the first conduit upon continued upward movement.

2. A submarine wellhead coupling, comprising a first conduit supported below water level in a substantially upright position, a second conduit having a surface at one end for mating engagement with the end surface of the first conduit, a downwardly facing shoulder on the first conduit, an upwardly facing shoulder on the second conduit, dogs having vertically spaced-apart lands on their inner surfaces with the upper lands supported on the shoulder of the second conduit for swinging between positions in which the lower lands are engaged beneath the shoulder on the first conduit to lock the second conduit to the first conduit, when the end surfaces thereof are in mating engagement with one another, and in which the lower lands are retracted from beneath the shoulder on the first conduit to release the second conduit from the first conduit, guide cables extending upwardly from beneath the water level, means for supporting the second conduit and guidable over the guide cables for lowering the second conduit into mating engagement with the first conduit, and remotely actuated means on the supporting means including an inner camming surface for engaging the outer surfaces of the dogs intermediate the lands thereon for swinging the locking dogs into locking position upon downward movement, as well as a surface on its upper end for engagement with projections on the dogs to release said dogs upon upward movement, the lower end of the locking dogs having tapered inner surfaces for guidably sliding over the outer surface of the first conduit as said second conduit is lowered onto it.

3. A submarine wellhead coupling, as defined in claim 2, wherein the shoulders on the conduit are tapered toward one another in an outward direction and the lands of the dogs are tapered correspondingly to the shoulders they engage, and the inner camming surface and the outer surfaces of the dogs are tapered in a downwardly diverging relation and at an angle with respect to the axis of the conduits which is less than the friction angle of said surfaces.

References Cited in the file of this patent
UNITED STATES PATENTS

| | | |
|---|---|---|
| 1,384,332 | Mullenux | July 12, 1921 |
| 1,519,097 | Kraft | Dec. 9, 1924 |
| 2,049,801 | Gage | Aug. 4, 1936 |
| 2,536,602 | Goett | Jan. 2, 1951 |
| 2,676,037 | Mueller | Apr. 20, 1954 |
| 2,726,848 | Montgomery | Dec. 13, 1955 |
| 2,808,230 | McNeill et al. | Oct. 1, 1957 |
| 2,952,482 | Torres | Sept. 13, 1960 |
| 3,025,916 | Frick | Mar. 20, 1962 |